Patented Nov. 16, 1937

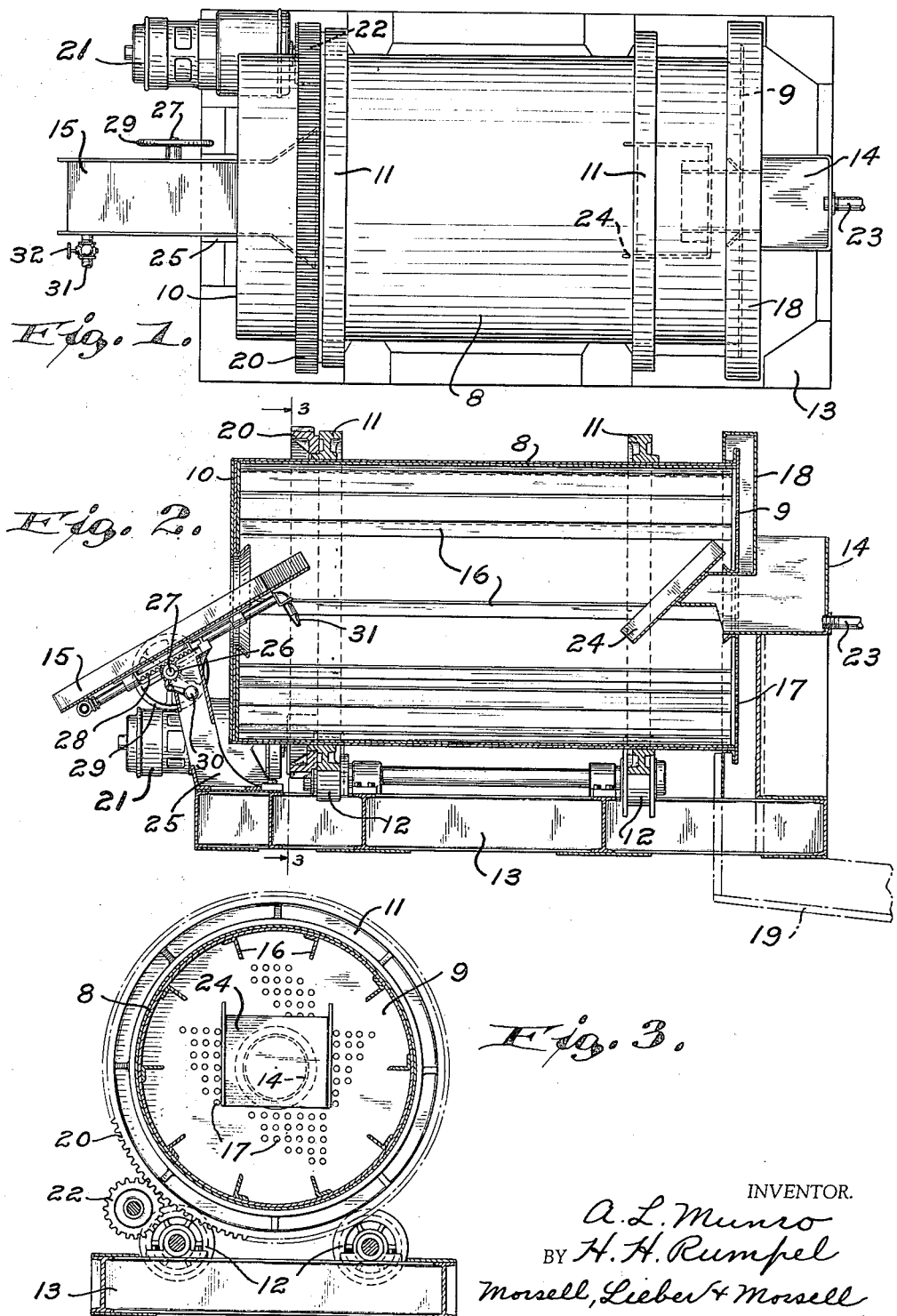

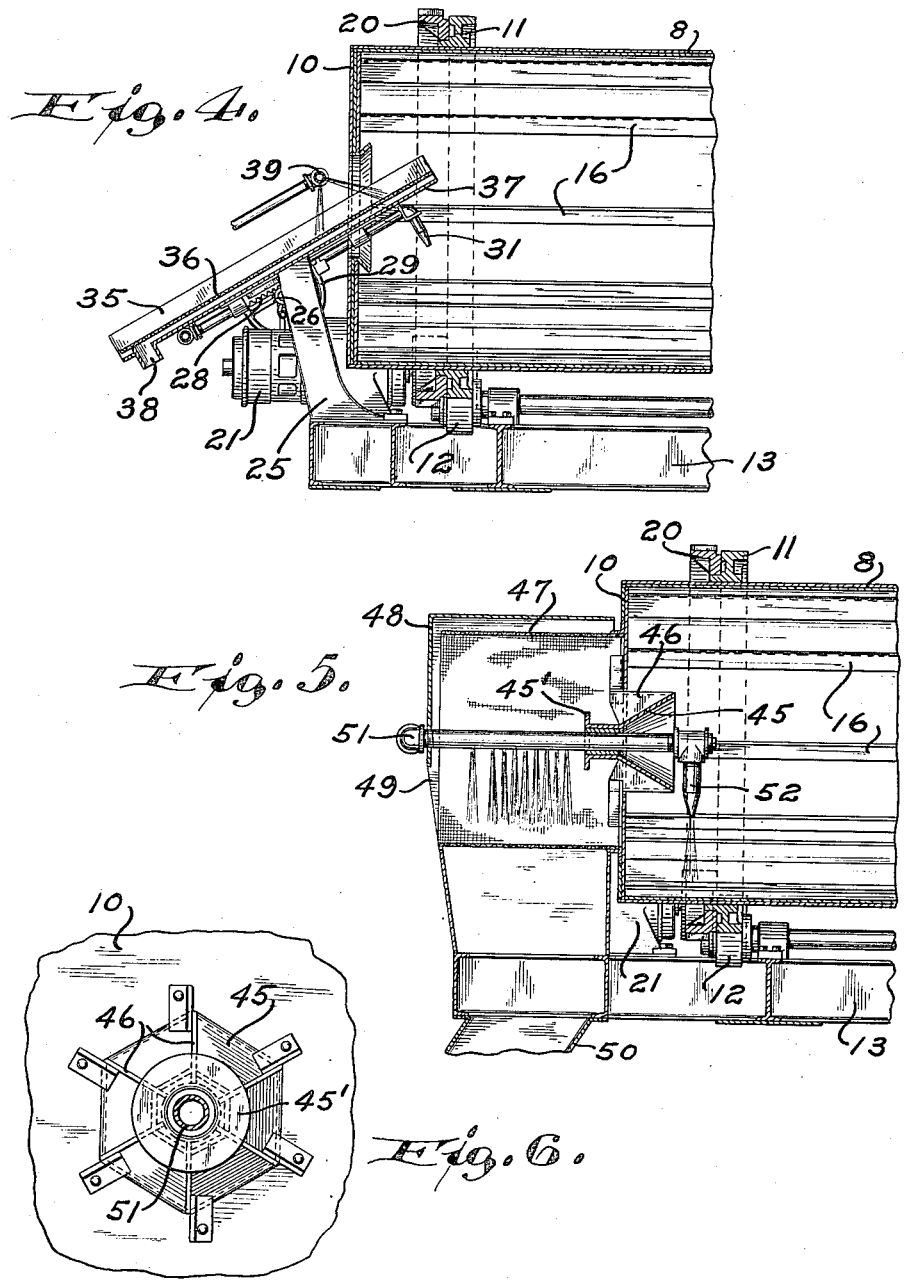

2,099,133

UNITED STATES PATENT OFFICE 2,099,133

GRANULAR MATERIAL WASHER

Alexander L. Munro and Harvey H. Rumpel, Milwaukee, Wis., assignors to Smith Engineering Works, Milwaukee, Wis., a corporation of Wisconsin Application January 4, 1935, Serial No. 334

2 Claims. (Cl. 209—452)

The present invention relates in general to improvements in the art of separating, and relates more specifically to improvements in the construction and operation of machines for washing and scrubbing granular material such as crushed stone or gravel so as to remove substances such as clay and fine sand therefrom.

Generally defined, an object of the invention is to provide an improved separator for granular materials or the like, which is simple and compact in construction, and which is moreover highly efficient in operation.

Many gravel and stone deposits contain clay and soft rock, which materially reduce the strength and life of concrete structures in which such deposits may be utilized. The undesirable ingredients, and especially the clay, are relatively tough and impervious to moisture, and when these are introduced into washers of the prior types, they merely roll into ball formation and are eventually delivered from the machine with the presumably washed stone. While it has heretofore been proposed to utilize revolving drum types of washers, these prior machines were objectionable in that they provided for delivery of the washed material and of the removed objectionable substances, from the same end of the washing chamber, and all of the prior washers having therefore proven relatively unsatisfactory.

It is therefore another object of the present invention to provide an improved washer which will insure most effective removal of clay, soft rock, silt or the like, from stones or crushed rock which it is intended to utilize in concrete structures.

Some of the more specific objects of the invention are as follows:

To provide an improved rotary scrubber for granular material such as gravel, which is operable with minimum power to effectively wash or separate maximum quantities of material.

To provide an effective gravel washer or the like, which will insure removal of clay and soft rock from the larger stones or particles, by combined impact, abrasion and washing action.

To provide an automatically functioning washing and scrubbing unit wherein a constant stream of material is effectively treated by a counter flowing stream of washing liquid.

To provide an improved drum type of separator wherein adhering particles of substance such as clay are quickly and effectively removed from more useful material such as coarse sand and stones.

To provide a machine capable of effectively agitating and mixing an advancing stream of granular material, and means for readily varying the period of treatment without stopping the machine.

To provide a granular material washer of durable construction, which may be manufactured, installed and operated at minimum cost, and which is extremely flexible in operation.

In accordance with the improvement, the raw material is delivered into a revolving drum in quantities sufficient to form a bed of considerable depth, and the drum is provided with flights which repeatedly elevate the outer layer of the bed to a position from whence the raised material drops upon the bed, thereby removing adhering particles of objectionable substance, by combined impact and abrasion. The operation of the drum at high speed, enhances the impact action, and the mass of material nearest the axis of the drum, is subjected to abrasion and grinding which insures effective removal and disintegration of the clay so that the reduced undesirable substance is positively removed by a constant counter-flow of washing liquid. The greater portion of the washing liquid is admitted at the washed material end of the drum, and is discharged at the inlet end, thereby effectively rinsing the treated product and insuring effective flushing of the undesirable substances from the mill. The feed end head is abundantly perforated so as to permit unobstructed escape of the clay and silt, and since these undesirable substances tend to float, the counter-flow insures escape thereof with minimum resistance.

A clear conception of embodiment of the various improved features, and of the mode of constructing and of operating washers built in accordance with the invention, may be had by referring to the drawings accompanying and forming a part of this specification in which like reference characters designate the same or similar parts in the various views:

Fig. 1 is a full top view of a washing or scrubbing unit completely assembled;

Fig. 2 is a central longitudinal vertical section through the washer of Fig. 1;

Fig. 3 is a transverse vertical section through the washer unit of Figs. 1 and 2, taken along the line 3—3 of Fig. 2;

Fig. 4 is a fragmentary central longitudinal vertical section through the coarse material delivery end of a modified type of washing apparatus;

Fig. 5 is a fragmentary central longitudinal vertical section through the coarse material delivery end of a further modified type of scrubbing unit; and Fig. 6 is a fragmentary view of the central delivery end portion of the unit of Fig. 5.

While the invention has been shown and described herein as being specifically applied to a sand and gravel washer of the motor driven rotary type, it is not intended to unnecessarily restrict the scope by such specific embodiment since some of the improved features may be more generally applicable to other types of equipment.

Referring to Figs. 1, 2 and 3 of the drawings, the improved washing and scrubbing unit shown therein, comprises in general a cylindrical rotary casing or drum 8 having inlet and discharge end heads 9, 10 respectively; spaced annular tires 11 secured to the periphery of the drum 8 and coacting with sets of rollers 12 journaled in the frame 13 to rotatably support the drum 8; an inlet chute 14 for feeding the raw or untreated granular material into the interior of the drum 8 through a central feed opening in the inlet end head 9; and an adjustable discharge spout 15 for effecting delivery of washed material from the interior of the drum 8 through a central discharge opening in the discharge end head 10.

The casing or drum 8 may be formed of sheet metal, and has a series of radial agitating and lifting flights 16 secured therein and extending throughout the length thereof, and the feed or inlet end head is provided with fine sand, clay and liquid discharge perforations 17 preferably extending throughout substantially the entire area thereof. The perforations 17 communicate with the interior of a stationary rejects-discharge housing 18 which in turn communicates with a liquid and rejects-delivery launder 19. The rollers 12 which rotatably support the drum 8, have anti-friction bearings, and a gear 20 secured to the drum 8 adjacent to one of the tires 11 is adapted to be driven by an electric motor 21 through a pinion 22.

The inlet or feed chute 14 which is supported upon the main frame 13, has a flushing water inlet connection 23 communicating therewith, and is adapted to deliver the untreated granular material into the interior of the drum 8 closely adjacent to the inlet end head 9. The inner end of the feed chute 14 projects within the drum 8 and provides a fixed support for an inclined material distributing trough 24 the primary function of which is to prevent the material from piling up against the inlet end head 9 and thus choking the perforations 17. The inclined discharge spout 15 is slidably adjustably supported upon a slide plate carried by brackets 25 mounted upon the frame 13, and is thus longitudinally adjustable within the central opening in the discharge end head 10 by means of a pinion 26 supported by a shaft 27 journaled in the brackets 25, and coacting with a rack 28 secured to the bottom of the spout 15. The shaft 27 is rotatable to revolve the pinion 26, by means of a hand wheel 29, and the pinion 26 is adapted to be locked in any position of adjustment, by a pawl 30 which is cooperable with the pinion teeth and is normally held in locking position by a weight as shown in Fig. 2. A continuous and abundant supply of washing liquid such as water, may be delivered into the scrubbing chamber formed by the drum 8, by means of a liquid supply pipe 31 which is fixedly mounted upon the underside of the spout supporting plate and upon the brackets 25; and the quantity of liquid supplied to the washer through the pipe 31 may be controlled by a valve 32 in an obvious manner. As shown, the end of the spout 15 which is located within the drum 8 and above the delivery end of the pipe 31, is spread laterally as clearly shown in Fig. 1.

During normal operation of the scrubbing unit shown in Figs. 1 to 3 inclusive, the drum 8 is being rotated by the electric motor 21, and liquid is being injected in suitable quantities into the interior of the revolving drum, through the supply pipes 23, 31. The raw or untreated granular material is being admitted to the washing chamber through the feed chute 14 in the presence of liquid discharged from the pipe 23, and falls by gravity into the path of the revolving series of flights 16. The flights 16 elevate the admitted material and liquid, and precipitate or shower the same upon the stationary distributing trough 24 which subsequently spreads and spouts the mixture into the medial lower portion of the drum 8. Here the granular material is subjected to thorough washing action by the abundant supply of liquid admitted from the pipe 31, and to a scrubbing action by the flights 16 which successively elevate and subsequently precipitate the granules and liquid while at the same time advancing the charge toward the delivery end of the unit. The counter flow of liquid passing through the forwardly advancing violently agitated granular material, removes the fine sand, clay and the like, and carries these rejects through the perforations 17 of the inlet end head 9, delivering the same to the launder 19; while the washed coarser constituents of the material, are ultimately lifted by the flights 16 and deposited upon the upper end of the delivery spout 15 along which the washed product is discharged from the drum 8, by gravity. It will thus be noted that the constantly advancing mass of granular material is subjected to violent agitation and constant spreading, and is simultaneously subjected to the washing action of an abundant counter flow of liquid which serves to effectively remove the undesirable particles.

The water delivered over the launder 19 may be reclaimed for subsequent use, and the quantity of liquid admitted to the drum 8 may be readily varied to meet desired conditions. By adjusting the final delivery spout 15, the material may be confined within the drum 8 for any desired period of time, and such adjustment may be conveniently effected with the aid of the hand wheel 29, without interrupting the normal operation of the machine. The trough 24 obviously serves to enhance the washing and scrubbing action by spreading and delivering the granular material into the medial portion of the washing chamber, and away from the feed end of the mill, thereby permitting free discharge of the rejects by eliminating clogging of the perforations 17.

Referring specifically to the modification shown in Fig. 4, the washing unit shown therein is similar in most respects to that previously described, but makes additional provision for the removal or separation of coarse sand from the oversize washed product. In this modification, the final discharge spout 35 which is adjustably supported upon the top plate and brackets 25, is formed of greater depth and is provided with a perforated bottom or screen 36 spaced from the normal imperforate bottom 37. The lower end of the inclined imperforate bottom 37 is provided with a sand delivery tube 38 which is directed away from the path of delivery of the oversize product discharged from the screen 36. An auxiliary liquid spray 39 may also be provided above the upper end of the screen 36, but this additional liquid supply may be omitted, since considerable liquid is naturally delivered from the interior of the drum 8 by the flights 16.

The normal operation of the mill shown in Fig. 4, is precisely the same as that previously described, but when the washed granular product is deposited by the flights 16 upon the screen 36, it gravitates downwardly along the screening surface and the coarse washed sand passes through the screen meshes and is deposited upon the imperforate inclined bottom 37. The larger stones or fragments are ultimately discharged from the lower end of the screen 36 in the direction of extent thereof, after the coarse sand has been washed therefrom by the water delivered from the spray 39. The removed coarse sand and liquid, are finally delivered at the lower end of the bottom 37 through the tube 38, in a direction away from the path of delivery of the coarser product, thus insuring effective separation of the sand from the larger stones.

Referring specifically to the further modified form of the invention, shown in Figs. 5 and 6, the washing unit of this modification is again similar to that previously described, excepting the final delivery end thereof. In this second modification, the final discharge has been replaced by a substantially conical discharge element 45 which has a guard flange 45' and is attached to the discharge end head 10 of the mill by means of radial lifter vanes 46. The element 45 and vanes 46 are rotatable with the drum 8 and form material discharge passages which are directed into the interior of a cylindrical or conical screen 47 which is also attached to the end head 10 and is rotatable with the drum 8. The screen 47 is enclosed within a housing 48 mounted upon the stationary frame 13, and has an oversize material discharge opening 49 at the lower portion of the open end of the screen 47. The lower end of the housing 48 communicates with a coarse sand and water discharge chute 50, and the liquid supply pipe 51 which communicates with the main liquid supply nozzle 52 within the mill, has perforations for spraying some of the liquid upon the material within the screen 47.

During normal operation of the modified washer of Figs. 5 and 6, the clay and fine sand are removed from the initial product, in precisely the same manner as previously described, and when the washed material reaches the discharge end of the mill, the flights 16 elevate and deposit the same upon the element 45 between the successive vanes 46. The material thus precipitated upon the inclined surface of the element 45 slides through the delivery opening of the end head 10 and strikes the flange 45' being thus directed upon the interior of the screen 47 closely adjacent to the head 10. During subsequent rotation of the mill, the coarse material travels along the interior of the rotating screen 47 and has the coarse sand washed therefrom by the auxiliary liquid sprays. The coarse sand and liquid pass through the screen 47 and are finally discharged through the housing 48 and chute 50, while the oversize material is finally discharged through the opening 49, thus again insuring effective separation of the coarse sand from the larger stones.

In all embodiments of the invention illustrated, it is to be noted that the material undergoing treatment is subjected to a combined impact, abrasion, and washing action, while it is being transported through the drum in a direction opposite to the direction of flow of the rinsing and washing liquid. The term "granular material" as employed herein is intended to cover any material from coarse sand to stones up to six inches in diameter.

From the foregoing description, it will be apparent that the present invention provides a simple, compact and highly efficient mechanism for automatically scrubbing and washing a constantly advancing stream of granular material, so as to remove clay, fine sand, or the like, from the coarser particles. The degree or rate of washing can be quickly varied by merely adjusting the final delivery spouts 15, 45 of Figs. 2 and 4 respectively, and the trough 24 insures effective distribution of the material being treated. The modifications of Figs. 4 and 5 permit effective separation of the coarse washed sand from the larger particles, and also provide for additional final washing of the oversize material. It is particularly noteworthy, that during the normal operation of this improved washer, the speed of rotation of the drum 8 may be varied so as to obtain any desired degree of cascading of the material from the flights 16. The falling stones and larger particles, are thereby subjected to a pounding action which, combined with the abrasion afforded by the finer particles, will effectively scrub the adhering clay and sticky material from the stones. The invention has proven highly advantageous and effective in actual commercial use; and the improved mill can be conveniently handled as a unit and can also be installed and operated at minimum cost.

It should be understood that it is not desired to limit the invention to the exact details of construction and to the precise mode of operation, herein shown and described, for various modifications within the scope of the claims, may occur to persons skilled in the art.

It is claimed and desired to secure by Letters Patent:

1. In combination, a rotary drum having internal flights for precipitating admitted material across the drum axis, feed means for delivering mixed fine and coarse granular material through an axial opening into one end of said drum, means for delivering liquid along the bottom of said feed means and through said opening, an inclined plate disposed within said drum and extending downwardly away from a point above said opening to conduct material precipitated thereon by said flights away from the feed end of said drum, means for effecting delivery of fine material directly from the peripheral portion of the feed end of said drum, an inclined discharge chute adjustable longitudinally of the drum axis and extending into the opposite end of said drum, the space within said drum between said plate and chute being devoid of obstruction, and means for producing a flow of liquid from beneath said chute toward the feed end of said drum and through the mixed material delivered from said feed means.

2. In combination, a rotary drum having opposite end heads provided with central feed and discharge openings respectively and also having internal means for showering material across the drum axis, a stationary feed hopper extending into said drum through said feed opening and having means for delivering liquid along the hopper bottom beneath the admitted coarse and fine mixed granular material, an inclined plate mounted upon the extreme inner end of said hopper and extending downwardly into said drum away from a point above said feed opening, an inclined discharge chute for coarse material mounted independently of said drum and extending upwardly into said drum through said discharge opening, the space within said drum between said plate and chute being devoid of obstruction, and means for delivering additional liquid into said drum beneath said chute, the feed end head of said drum being perforated near the drum periphery to permit escape of said liquid and fine material.

ALEXANDER L. MUNRO.
HARVEY H. RUMPEL.